(12) United States Patent
Stuckey (10) Patent No.: US 7,006,930 B2
(45) Date of Patent: Feb. 28, 2006

(54) METHOD OF ANALYZING TIRE PITCH SEQUENCE BASED ON LUG STIFFNESS VARIATIONS

(75) Inventor: Jon Irvin Stuckey, Louisville, OH (US)

(73) Assignee: Bridgestone/Firestone North American Tire, LLC, Nashville, TN (US)

( * ) Notice: Subject to any disclaimer, the term of this patent is extended or adjusted under 35 U.S.C. 154(b) by 669 days.

(21) Appl. No.: 10/225,807

(22) Filed: Aug. 21, 2002

(65) Prior Publication Data

US 2003/0040886 A1 Feb. 27, 2003

Related U.S. Application Data

(60) Provisional application No. 60/314,085, filed on Aug. 22, 2001, and provisional application No. 60/314,403, filed on Aug. 23, 2001.

(51) Int. Cl.
G06F 19/00 (2006.01)
B60C 11/03 (2006.01)

(52) U.S. Cl. .......................... 702/39; 703/8; 152/209.2; 152/209.5

(58) Field of Classification Search ............... 703/7, 703/8, 1; 702/39, 191; 152/209.11, 209.2, 152/209.3, 209.5
See application file for complete search history.

(56) References Cited

U.S. PATENT DOCUMENTS

| | | |
|---|---|---|
| 3,926,238 A | 12/1975 | Vorih |
| 3,989,780 A | 11/1976 | Vorih |
| 4,178,199 A | 12/1979 | Lippman et al. |
| 4,327,792 A | 5/1982 | Landers |

(Continued)

FOREIGN PATENT DOCUMENTS

| | | |
|---|---|---|
| EP | 0 454 658 A2 | 10/1991 |
| EP | 0 645 264 A2 | 9/1994 |
| EP | 0 691 219 A2 | 1/1996 |
| EP | 0 743 200 A1 | 11/1996 |
| JP | 1-178005 | 7/1989 |
| JP | 4-123907 | 4/1992 |

OTHER PUBLICATIONS

Williams, "Tire Tread Pattern Noise Reduction Through the Application of Pitch Sequencing", date unknown.*
Honeywell Saicor Signals, "Correlation and Probability Analysis" by Dr. I.M. Langenthal, Apr. 1970.
"The Hilbert Transform and Application to Correlation Measurements" by J. R. Underbrink, ACS 516, Dec., 1992.
"Tyre Noise Simulation at Computer" by F.N. Mambretti dated 1988., pp. 175–182.
John J. Benedetto and Michael W. Frazier; Wavelets: Mathematics and Applications; date unknown; pp. 2–13.
Brian G. Ferguson and Barry G. Quinn; Application of the short–time Fourier transform and the Wigner–Ville distribution to the acoustic localization of aircraft; Aug. 1994; pp. 821–827.

(Continued)

Primary Examiner—Patrick Assouad
(74) Attorney, Agent, or Firm—Fred H. Zollinger, III; Michael R. Huber (57) ABSTRACT

A method of comparing tire noise pitch sequences based on the tire noise generated by tire tread lug stiffness variations provides a secondary examination technique used to evaluate tire noise pitch sequences that have been selected by traditional evaluation techniques. The method includes the steps of defining the tire noise pitch sequence and the pitch lengths, calculating the differential between the arc length from an arbitrary fixed reference point to the end of each pitch length in the pitch sequence and the arc length of the mean pitch length of the number of pitches from that arbitrary reference point, and analyzing the differential to identify desirable and undesirable tire noise characteristics.

19 Claims, 8 Drawing Sheets

U.S. PATENT DOCUMENTS

| | | | |
|---|---|---|---|
| 4,416,316 A | 11/1983 | Clatworthy et al. | |
| 4,442,499 A | 4/1984 | Sekula et al. | |
| 4,474,223 A | 10/1984 | Landers | |
| 4,721,141 A | 1/1988 | Collette et al. | |
| 4,727,501 A | 2/1988 | Parker et al. | |
| 4,788,651 A | 11/1988 | Parker et al. | |
| 4,936,364 A | 6/1990 | Kajiwara et al. | |
| 5,240,054 A | 8/1993 | Kogure | |
| 5,295,087 A | 3/1994 | Yoshida et al. | |
| 5,309,965 A | 5/1994 | Williams | |
| 5,314,551 A | 5/1994 | Williams | |
| 5,327,952 A | 7/1994 | Glover et al. | |
| 5,371,685 A | 12/1994 | Bandel et al. | |
| 5,383,506 A | 1/1995 | Kogure | |
| 5,394,916 A | 3/1995 | Williams | |
| 5,617,341 A | 4/1997 | Nakajima | |
| 5,717,613 A * | 2/1998 | Nakajima | 703/1 |
| 5,733,393 A | 3/1998 | Hubbell et al. | |
| 5,746,848 A | 5/1998 | Schulze et al. | |
| 5,753,057 A | 5/1998 | Wesolowski | |
| 5,759,310 A | 6/1998 | Wesolowski | |
| 5,759,311 A | 6/1998 | Williams | |
| 5,759,312 A | 6/1998 | Wesolowski | |
| 5,769,990 A | 6/1998 | Hoffmeister | |
| 5,824,169 A | 10/1998 | Landers et al. | |
| 5,865,921 A | 2/1999 | Zakelj et al. | |
| 5,964,266 A | 10/1999 | Boiocchi et al. | |
| 5,974,872 A * | 11/1999 | Morishita et al. | 73/146 |
| 6,112,167 A | 8/2000 | Zakelj | |
| 6,311,748 B1 | 11/2001 | Boiocchi et al. | |
| 6,321,180 B1 * | 11/2001 | Hubbell, Jr. | 702/191 |
| 6,363,984 B1 * | 4/2002 | Morgan | 152/209.2 |
| 6,514,366 B1 * | 2/2003 | Xie | 156/110.1 |
| 6,531,012 B1 * | 3/2003 | Ishiyama | 156/110.1 |

OTHER PUBLICATIONS

R.C. Mellin and G. Sovran; Controlling the Tonal Characteristics of the Aerodynamic Noise Generated by Fan Rotors; Mar. 1970; pp. 143–154

Thomas A. Williams; Tire Tread Pattern Noise Reduction Through the Application of Pitch Sequencing; date unknown; pp. 955–959.

Thomas A. Williams, Tire Tread Pattern Noise Reduction Through The Application Of Pitch Sequencing, Hankook Tire, pp. 955–959.

* cited by examiner

METHOD OF ANALYZING TIRE PITCH SEQUENCE BASED ON LUG STIFFNESS VARIATIONS

CROSS REFERENCE TO RELATED APPLICATIONS

The present application claims priority from U.S. patent application Ser. No. 60/314,085 filed Aug. 22, 2001, and U.S. patent application Ser. No. 60/314,403 filed Aug. 23, 2001; the disclosures of both are incorporated herein by reference.

BACKGROUND OF THE INVENTION

1. Technical Field

The present invention generally relates to methods of analyzing tread patterns for tire noise. More particularly, the invention relates to a method for comparing tread pattern tire noise created by variations in lug stiffness. The invention specifically relates to a method for analyzing tire noise created from variations in tread lug stiffness based on the distribution of the lugs in the tire noise pitch sequence.

2. Background Information

One aspect of tire design involves minimizing undesirable tire noise. Tire noise is generated when the lugs of the tread pattern contact the road surface. An unvarying tread pattern creates an undesirable mono pitch sound. Tire designers vary the tread pattern to avoid mono pitch sounds. The tread patterns are typically varied by altering the size of the tread pitches around the circumference of the tire. Varying the sizes of the tread pitches tends to reduce mono pitch tire noise by broadening the frequency domain of the noise spectrum but undesirable noise in the time domain can still be created.

Tread patterns are currently analyzed by comparing the tire noise generated by different variations in the tread pitches. Known analysis techniques allow the tire designer to select a pitch pattern for the tread design that generates acceptable tire noise. One such technique uses the Fourier spectrum of the pitch sequence to identify objectionable pitch sequences. Another technique disclosed in U.S. Pat. No. 6,112,167 analyzes portions of the pitch sequence around the circumference of the tire. Although these techniques have been effective, tire designers have found that known techniques can result in tire noise pitch sequence designs that pass initial screening while still having undesirable tire noise. Tire molds having such sequences must be rebuilt or modified to reduce the undesirable noise. One cause of undesirable noise is tire noise attributed to the variations in the lug stiffness around the circumference of the tire.

When the size of the tread pitches is varied, the size of the lugs of the tread pattern is varied. The lugs thus have different stiffnesses and produce different sound amplitudes when they contact the road surface. These differences create sound amplitude variation that can make an otherwise desirable pitch sequence undesirable. In the past, this undesirable tire noise was not analyzed and tires would be produced before the undesirable noise was recognized. If the customer objected to the noise, the tire manufacturer would have to scrap the expensive tire mold or would have to modify the mold. The art thus desires a secondary screening method that allows the tire designer to compare a group of otherwise desirable pitch sequences. Such a secondary screening method would analyze the tire noise generated from lug stiffness variations.

BRIEF SUMMARY OF THE INVENTION

In view of the foregoing, the present invention provides a method of comparing tire noise pitch sequences based on the tire noise generated by tire tread lug stiffness variations. The method of the invention may be used as a primary analysis technique or as a secondary examination technique used to evaluate tire noise pitch sequences that have been selected by traditional evaluation techniques.

The method of the invention may be achieved by defining the tire noise pitch sequence and the pitch lengths, calculating the differential between the arc length from an arbitrary fixed reference point to the end of each pitch length in the pitch sequence and the arc length of the mean pitch length of the number of pitches from that arbitrary reference point, and analyzing the differential to identify desirable and undesirable tire noise characteristics.

In one embodiment of the invention, the differential may be calculated by arranging the pitch ratio numbers in the order of the tire noise pitch sequence and calculating the differential between an accumulated sum of the pitch ratio numbers to the accumulated mean of the pitch ratio numbers. A Fourier analysis or other spectral analysis technique may be performed on the differential to provide an analysis tool.

The invention provides tires having tread patterns and pitch sequences derived from the application of the method of the present invention. The invention also provides a computer adapted to perform the method of the invention.

BRIEF DESCRIPTION OF THE SEVERAL VIEWS OF THE DRAWINGS

Similar numbers refer to similar parts throughout the specification.

DETAILED DESCRIPTION OF THE INVENTION

The method of the present invention allows the tire designer to analyze the tire noise generated by the variations in tread lug stiffness. Pneumatic tire tread patterns include tread pattern segments having different sizes so that the tires will not create undesirable mono pitch tire noise. When the size of the tread segments is varied, the stiffnesses of the lugs of the tread segments varies. These lugs impact the ground as the tire rotates. The impact causes tire noise of which the amplitude is varied by the stiffness of the lugs. The present invention allows the tire designer to analyze this tire noise and to eliminate tire designs having undesirable tire noise before sample tires are produced.

Figure 1:
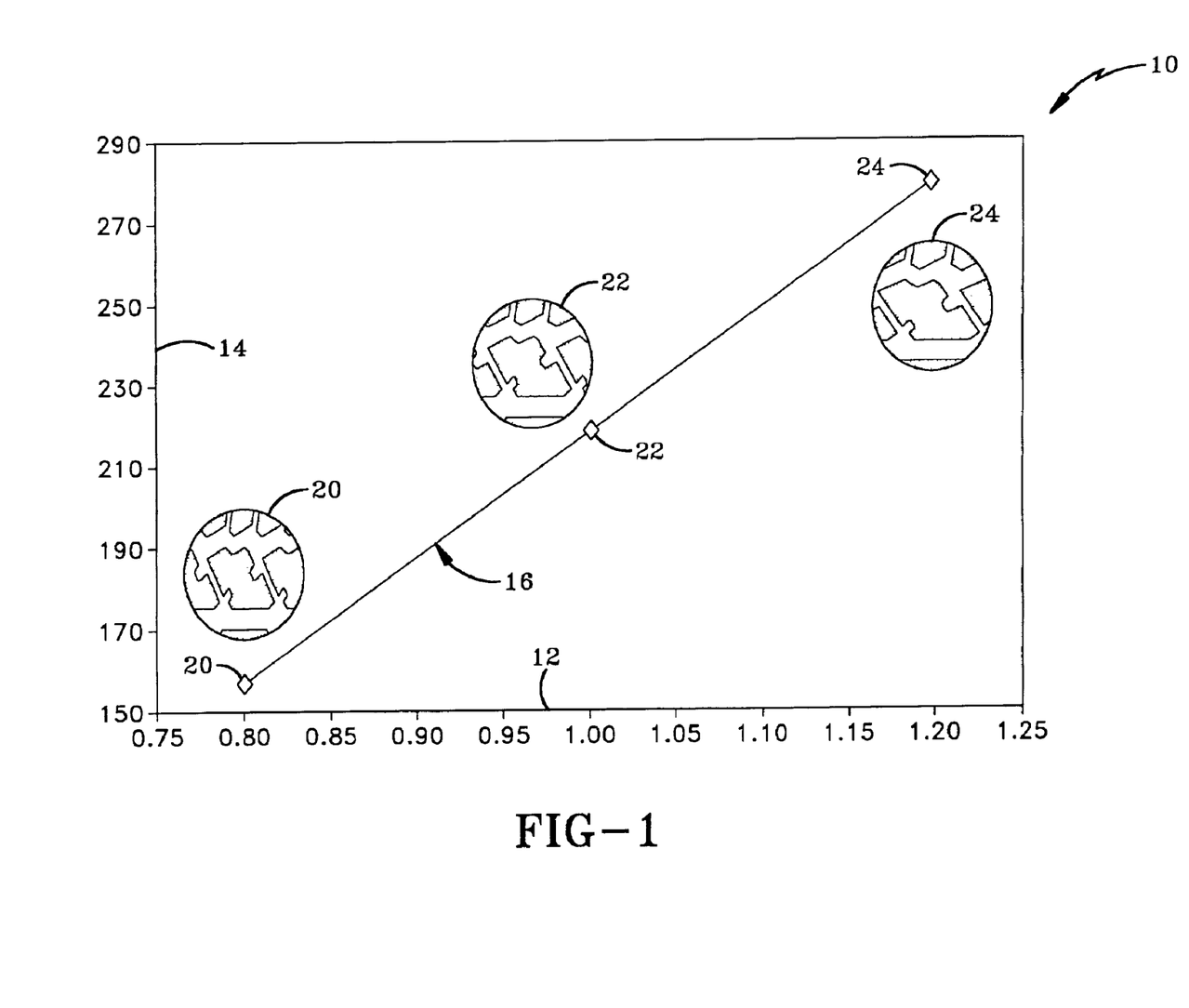
FIG. 1 shows a graphical representation of the linear relationship between shear stiffness and the size of the tread lug.

The method of the invention uses the fact that there is a substantial linear relationship between tire lug stiffness and tire lug size. The graph 10 of FIG. 1 shows the linear relationship between the lug stiffness and the size of the lug. Graph 10 has a horizontal axis 12 that represents normalized pitch ratios from 0.75 to 1.25 that are equal to lug size divided by the mean pitch size for the pitch ratio. The vertical axis 14 represents the shear stiffness (N/m) of a tread element or tread lug. The data line 16 shows the substantially linear relationship between shear stiffness and size. Representative data is shown for a small lug 20, a medium lug 22, and a large lug 24. The stiffness varies linearly with respect to lug size because the different-sized tire lugs are the same fundamental shape. The lugs are also disposed at similar angles with respect to the circumferential direction of the tire. The method of the invention thus uses the size variation to analyze the noise generated from the stiffness variation.

Figure 2A:
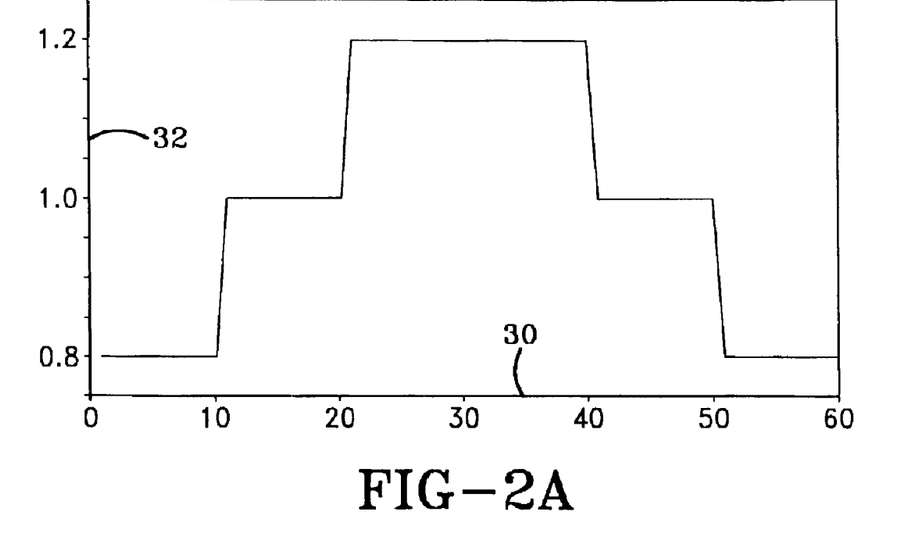
FIG. 2A is a graphical representation of a structured tire noise pitch sequence that has 10 ones at 0.8, 10 twos at 1.0, 20 threes at 1.2, 10 twos at 1.0, and 10 ones at 0.8.
Figure 2B:
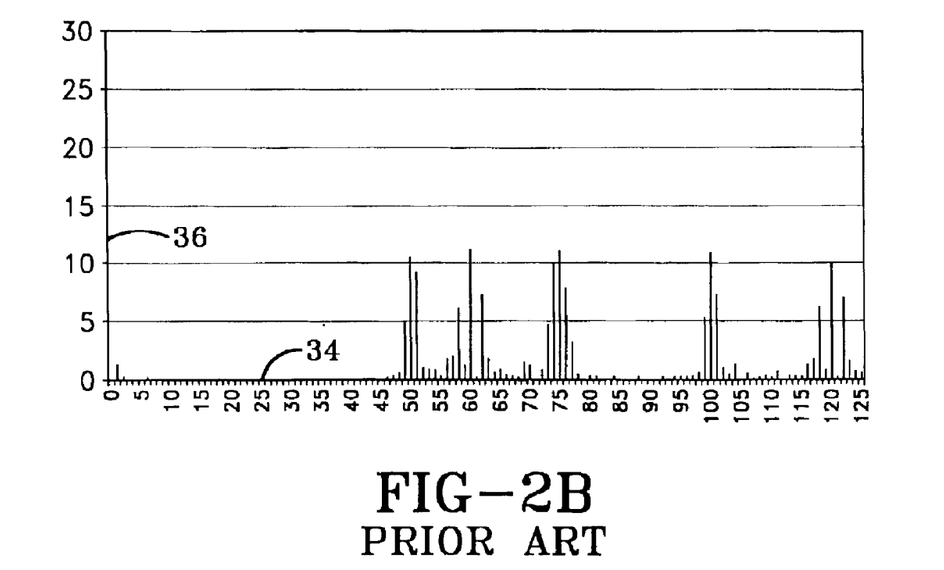
FIG. 2B is a Fourier analysis of the structured tire noise pitch sequence of FIG. 2A showing small amplitude peaks around 50, 60, 75, 100, and 120; this analysis technique being prior art.

FIGS. 2A and 2B show a prior art impulse model analysis of a mountain-style pitch sequence. The pitch sequence is shown graphically in FIG. 2A with the horizontal axis 30 representing 60 degrees of the circumference of a tire. The vertical axis 32 represents the pitch ratio. The graph of FIG. 2B shows an impulse model analysis of the pitch sequence of FIG. 2A. The horizontal axis 34 represents the harmonic number and the vertical axis 36 represents the amplitude. The graph of FIG. 2B shows that the pitch sequence of FIG. 2A lacks a large single harmonic suggesting that the sequence will not produce undesirable tire noise related to the pitch sequence. As described above, a drawback with this technique is that the sequence of FIG. 2A may still create undesirable tire noise related to the variations in lug stiffness. The prior art analysis technique of FIG. 2B does not identify this problem.

Figure 2C:
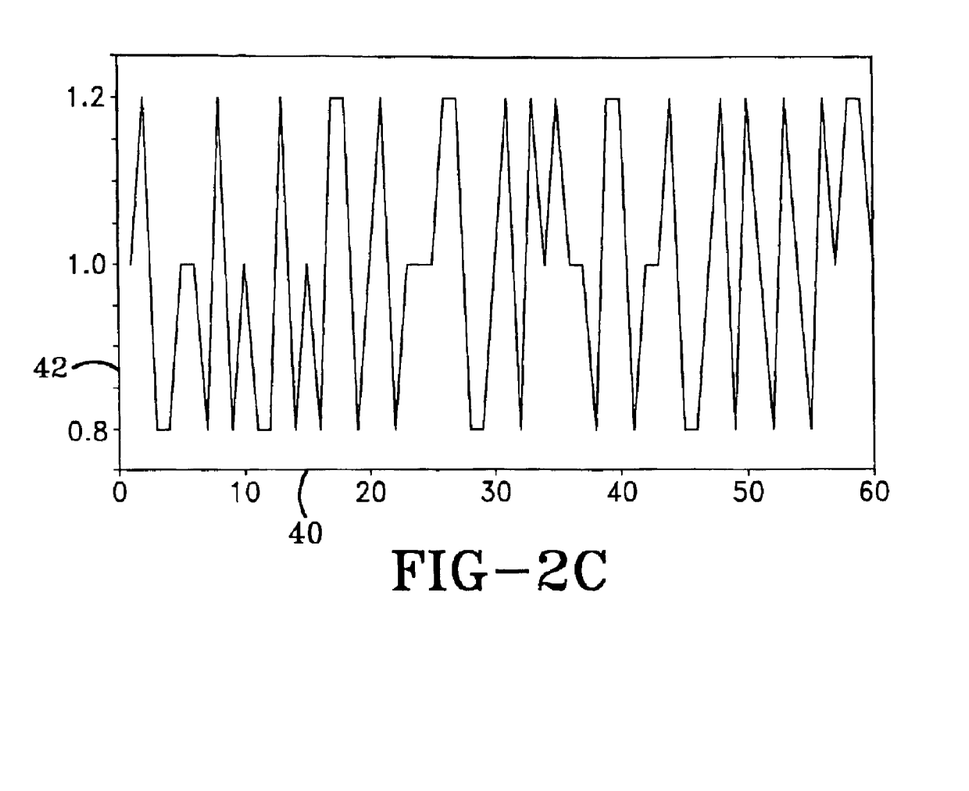
FIG. 2C is a graphical representation of a random tire noise pitch sequence that the ones, twos, and threes randomly disposed in the sequence.
Figure 2D:
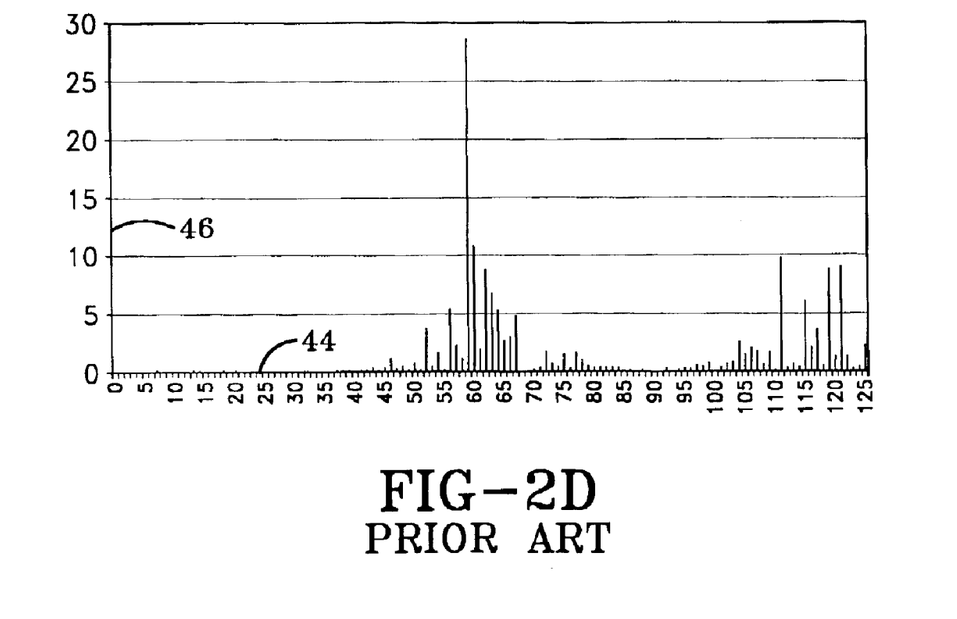
FIG. 2D is a Fourier analysis of the random tire noise pitch sequence of FIG. 2C showing large amplitude peak around 60.

FIGS. 2C and 2D show a prior art impulse model analysis of a random-style pitch sequence. The pitch sequence is shown graphically in FIG. 2C with the horizontal axis 40 representing 60 degrees of the circumference of a tire. The vertical axis 42 represents the pitch ratio. The graph of FIG. 2D shows an impulse model analysis of the pitch sequence of FIG. 2C. The horizontal axis 44 represents the harmonic number and the vertical axis 46 represents the amplitude. The graph of FIG. 2D shows that the pitch sequence of FIG. 2C includes a strong harmonic at the number 60 suggesting that the sequence will produce undesirable tire noise related to the tire noise pitch sequence.

Figure 3A:
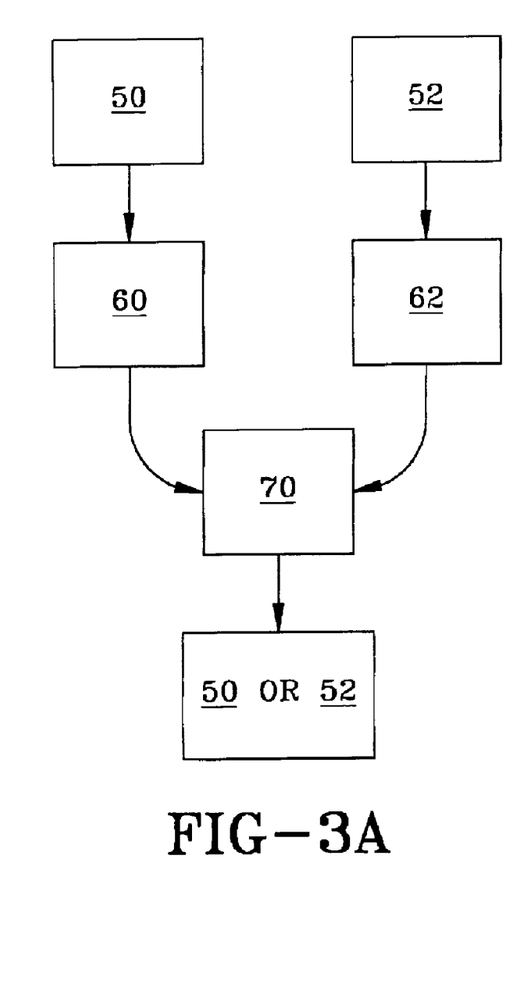
FIG. 3A is a flow chart of the general method of the present invention.

The method of the present invention is generally shown in the FIG. 3A flow chart. In general the present invention allows the tire designer to compare different tire noise pitch sequences based on the variations in the tread lug stiffness. Although the method may be used on its own, the invention may be used to compare desirable sequences that have been identified by other methods. The invention is thus used as a secondary screening technique in this manner. The invention thus broadly relates to a method for comparing tire noise pitch sequences by simulating the tire noise that would be generated by the tire noise pitch sequence if incorporated into a tire. The first steps 50 and 52 are to select first and second tire noise pitch sequences. The second steps 60 and 62 are to predict the tire noise generated by the first and second tire noise pitch sequences by analyzing the variations in the tread lug stiffnesses. The next step 70 is to compare the result of step 60 to the result of step 62 to determine which sequence selected in steps 50 and 52 has more desirable noise properties.

Figure 3B:
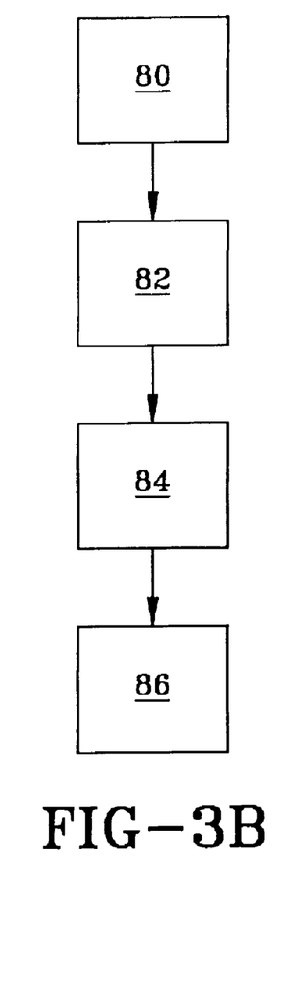
FIG. 3B is a low chart showing the steps of the analysis technique.
Figure 4A:
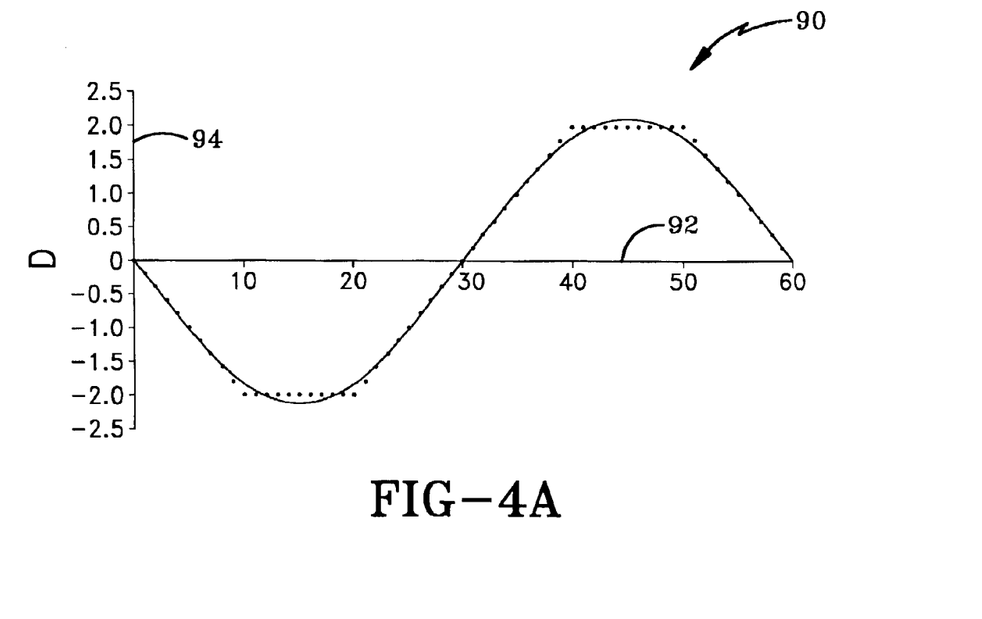
FIG. 4A is a graphical representation of the accumulated differential of the structured sequence shown in FIG. 2A.
Figure 4B:
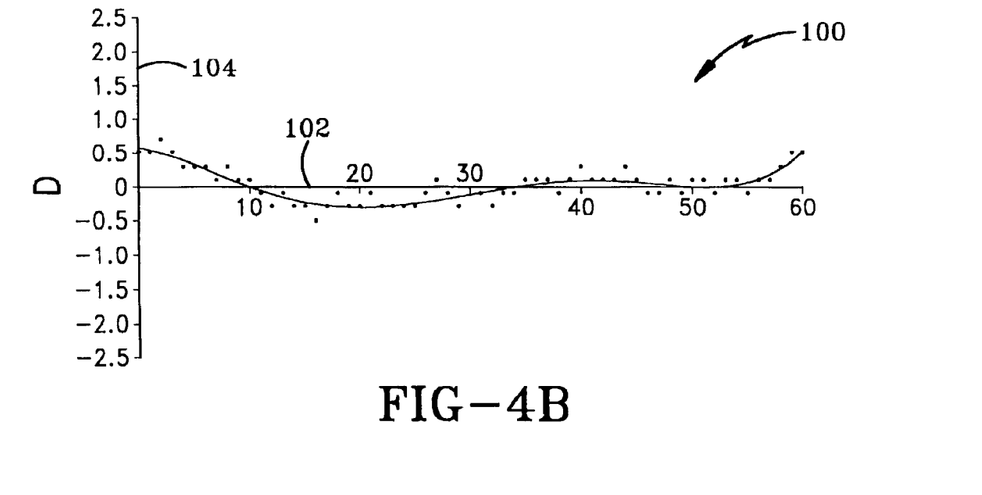
FIG. 4B is a graphical representation of the accumulated differential of the random sequence shown in FIG. 2C.
Figure 5:
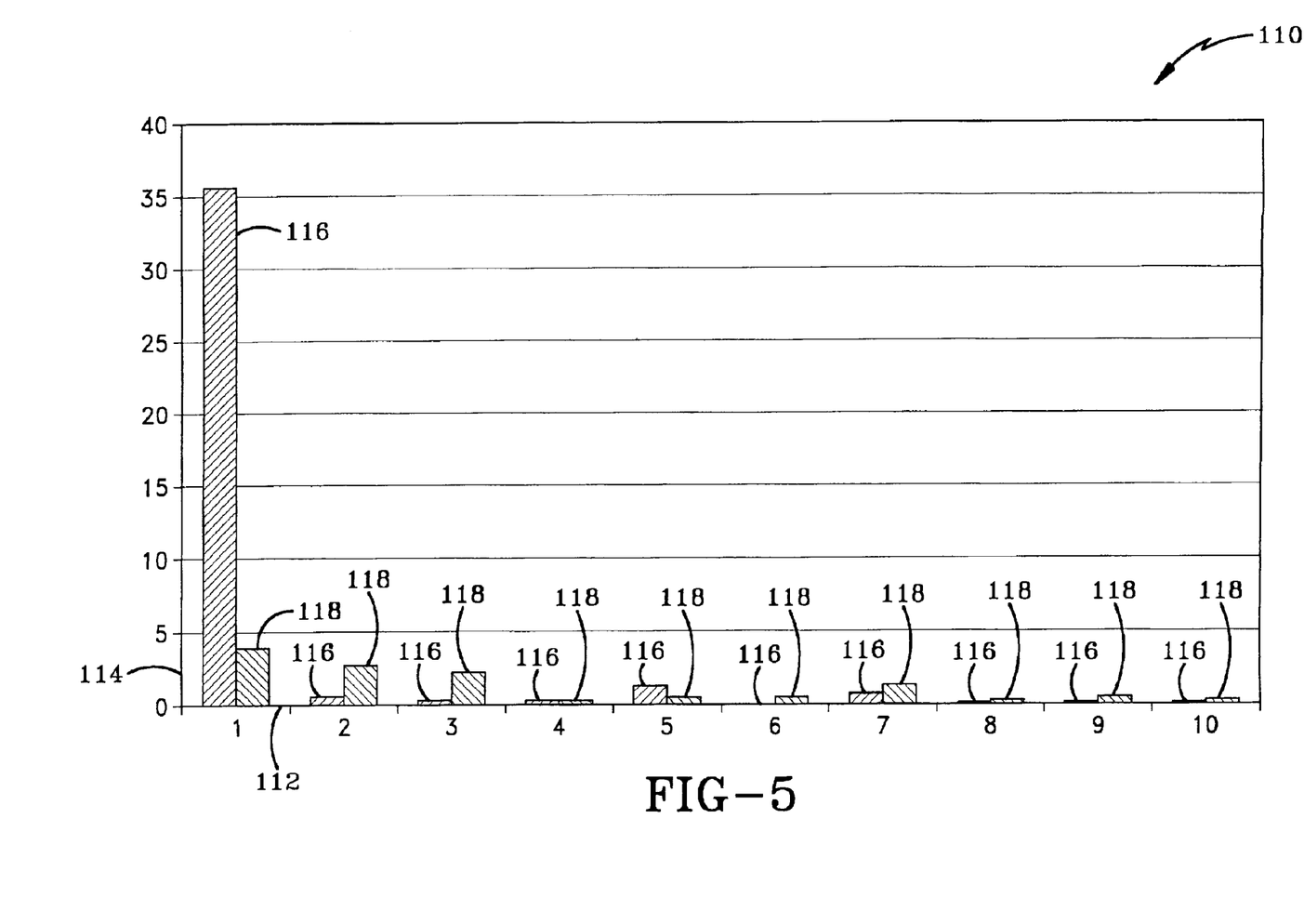
FIG. 5 is a graph showing the a Fourier analysis of the data from both the structured and random sequences.

FIG. 3B shows a flow chart of each analysis step 60 and 62 shown in FIG. 3A. The analysis process includes the step of performing a Fourier or spectral analysis 86 of the accumulation of the deviation (D) 84 of the arc length 82 from the arc length of the mean pitch size 80. FIGS. 4A and 4B graphically represent D for the structured and random sequences of FIGS. 2A and 2C. The Fourier analysis of each is shown in FIG. 5.

D is a vector of the difference in the actual arc length from a fixed arbitrary reference point along the tire (generally the start of a given pitch) to the end of the $i^{th}$ mean pitch. For example, the calculation for the twentieth pitch requires the summation of the length of pitches 1–20. Twenty times the mean pitch length is then subtracted from this summation to determine the difference for $D_{20}$. D is thus calculated for each pitch. $D=\{D_1, D_2, D_3, \ldots D_i, \ldots D_{N-1}, D_N\}$ N is the total number of tread pitches placed about the circumference of the tire.

$D_1$ may be calculated using the following relationship:

$D=X_i-\text{mean } X_i$ $X_i=\text{sum } L_j \ (j=1 \text{ to } i)$ mean $X_i=(i)(C/N)$ wherein:

$X_i$ is the arc length from the fixed reference point to the end of the $i^{th}$ tread pitch;

mean $X_i$ is the arc length of i pitches times the mean pitch size;

L is the length of the pitch; and

C is the circumference of the tire and may be represented by a length, a percent (100), a degree (360), or the like.

The method may normalize the calculation to C so that sequences having different numbers of pitches may be compared. For example, a tire circumference with 20 pitches has a mean pitch size of 5% or 18 degrees wherein the same circumference with 40 pitches has a mean pitch size of 2.5% or 9 degrees. In another embodiment of the invention, the method does not have to be normalized. In this application, the length of the circumference of the tire is used.

FIGS. 4A, 4B, and 5 show how the analysis technique of the invention is used to analyze the structured sequence of FIG. 2A and the random sequence of FIG. 2C. FIG. 4A shows the differential 90 between the accumulated sum of the mean and the accumulated sum of the sequence. For the first ten pitch numbers the accumulated mean is 1.0, 2.0, 3.0, 4.0, 5.0, 6.0, 7.0, 8.0, 9.0 and 10.0. The accumulated sum of the sequence is 0.8, 1.6, 2.4, 3.2, 4.0, 4.8, 5.6, 6.4, 7.2, and 8.0 (because all pitches are 0.8) The next ten pitches are 1.0 and are thus equal to the mean so that the differential is unchanging and shown by the flat portion of the curve between pitches 10 and 20. The next 20 pitches are 1.2 which causes the differential to rise accordingly. In FIG. 4A, the horizontal axis 92 is the pitch number over 60 degrees with the vertical axis 94 representing the accumulated pitch size. A Fourier or spectral analysis is performed on the differential represented on graph 90 of FIG. 4A to create the modulation information shown in FIG. 5 indicated by the numeral 116. In FIG. 5, the horizontal axis 112 is the stiffness variation orders (event per revolution) with the vertical axis 114 representing the linear amplitude. This analysis shows the structured sequence of FIG. 2A has a high first order magnitude and generally low second through fifth orders. This indicates that undesirable tire noise will result from the stiffness variations in the sequence of FIG. 2A. This result is contrary to the prior art result shown in FIG. 2B. A similar analysis is represented in FIGS. 4B and 5 where the random sequence is analyzed. In FIG. 4B, the horizontal axis 102 is the pitch number over 60 degrees with the vertical axis 104 representing the accumulated pitch size. A Fourier analysis or other type of spectral analysis is performed on the differential represented on graph 100 of FIG. 4B to create the modulation information shown in FIG. 5 indicated by the numeral 118. This analysis shows the random sequence of FIG. 2C to have generally low and level amplitudes through the first five orders. This indicates that undesirable tire noise will not result from the stiffness variations in the sequence of FIG. 2C. This result is contrary to the prior art result shown in FIG. 2D. This analysis thus shows that lug stiffness variations must be separately analyzed in addition to the prior art impulse model techniques in order to identify sequences having undesirable tire noise.

Figure 6:
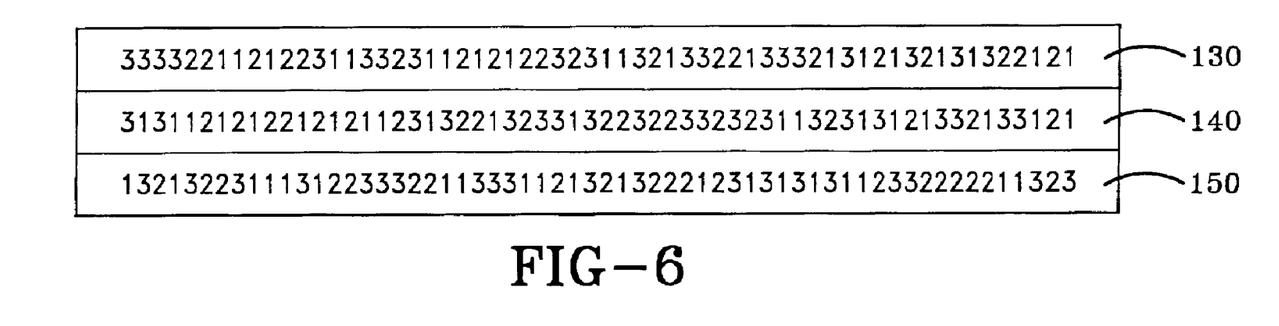
FIG. 6 shows three exemplary sequences with each sequence having three pitch sizes.
Figure 7:
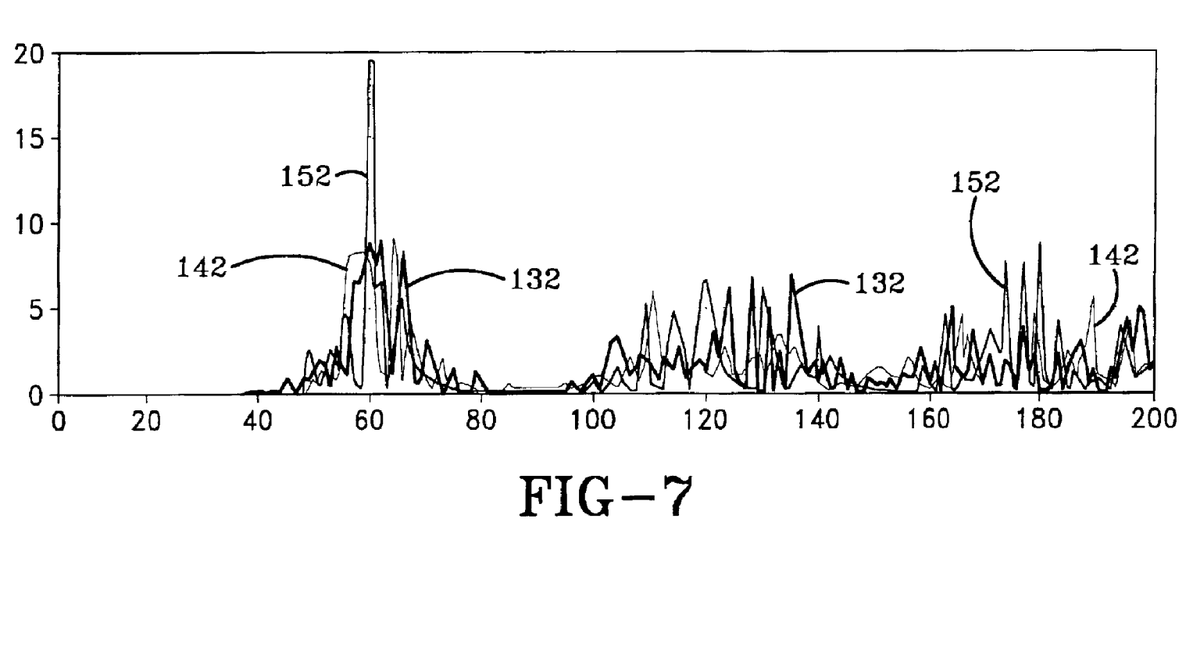
FIG. 7 shows the graphical result of the prior art analysis technique for all three exemplary sequences.
Figure 8:
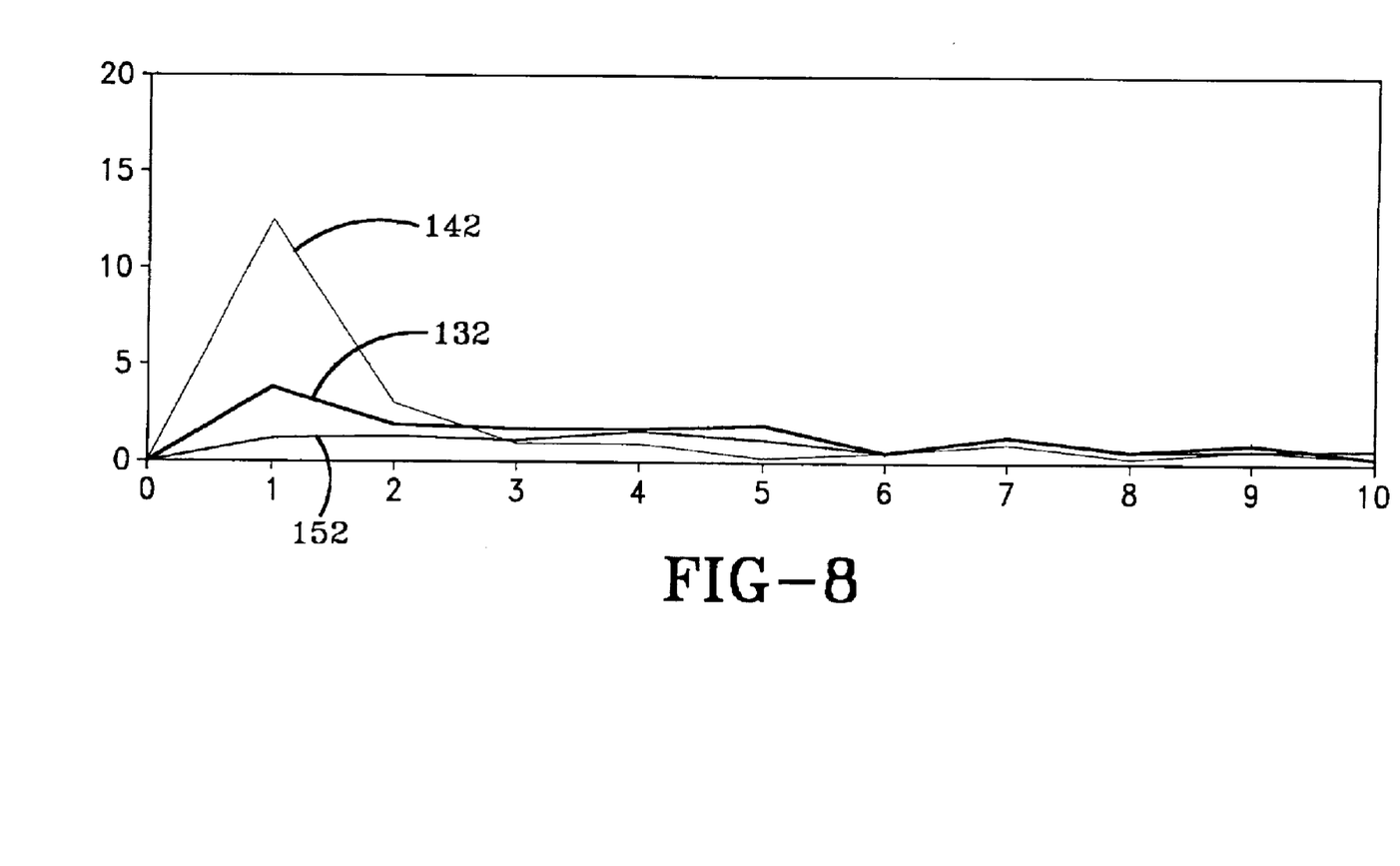
FIG. 8 shows the graphical result of the analysis method of the present invention used on the three sequences of FIG. 6.

FIGS. 6, 7, and 8 show how the method of the present invention may be used to compare three sequences 130, 140, and 150. FIG. 6 lists the sequences. FIG. 7 shows a graph similar to the graph depicted in FIGS. 2B and 2D. FIG. 8 shows a graph similar to the chart depicted in FIG. 5. The prior art analysis technique is shown graphically in FIG. 7 wherein line 152 associated with sequence 150 has an amplitude peak around sixty. The other two lines 132 and 142 show good results under the prior art method. The results of the analysis method of the present invention are shown in FIG. 8, wherein the two good results 132 and 142 of FIG. 7 have dramatically different results in the first order. Line 142 in FIG. 8 has a high amplitude peak at the first order indicating that sequence 140 will have undesirable tire noise associated with lug stiffness variations. Line 132 is generally level through the first five orders. The tire designer would thus choose sequence 140 given its acceptable results from both tests.

The method described above may be performed on a computer that performs some of the steps described above. Such a computer will run software that accepts the tire information required to perform the method. The software performs the method and outputs the analysis result discussed above. In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the invention is an example and the invention is not limited to the exact details shown or described.

What is claimed is:

1. A method for comparing tire noise pitch sequences by simulating the tire noise that would be generated by the tire noise pitch sequence if incorporated into a tire; the method comprising the steps of:
   (a) selecting a first tire noise pitch sequence;
   (b) predicting the tire noise generated by the first tire noise pitch sequence by analyzing the variations in the tread lug stiffnesses;
   (c) selecting a second tire noise pitch sequence;
   (d) predicting the tire noise generated by the second tire noise pitch sequence by analyzing the variations in the tread lug stiffnesses; and
   (e) comparing the result of step (b) to the result of step (d).

2. The method of claim 1, wherein steps (b) and (d) include the step of performing a Fourier analysis of the accumulation of the deviation of an arc length from an arc length of the mean pitch size.

3. The method of claim 1, wherein steps (b) and (d) include the step of performing a spectral analysis of the accumulation of the deviation of an arc length from an arc length of the mean pitch size.

4. The method of claim 1, wherein steps (b) and (d) include the steps of:
   (f) identifying the pitch lengths for the tire noise pitch sequence;
   (g) calculating the arc length from an arbitrary fixed reference point to the end of each pitch length of the pitch sequence;
   (h) calculating the mean pitch arc length for each pitch length of the pitch sequence; and
   (i) analyzing the difference between the arc lengths of the pitch sequence and the arc lengths of the mean pitch lengths.

5. The method of claim 4, wherein step (i) includes the step of performing a Fourier analysis on the difference.

6. The method of claim 4, wherein step (i) includes the step of performing a spectral analysis on the difference.

7. The method of claim 5, further including the step of calculating the difference with the formula $D=X_i-\text{mean } X_i$, where $X_i=\text{sum } L_j$ (j=1 to i) and mean $X_i=(i)(C/N)$; wherein N is the total number of tread pitches placed about the circumference of the tire; C is the circumference of the tire; $X_i$ is the arc length from the fixed reference point to the end of the $i^{th}$ tread pitch; L is the length of the pitch; and mean $X_i$ is the arc length of i pitches times the mean pitch size.

8. The method of claim 5, further comprising the step of analyzing the variance in the first through fifth orders identified by the Fourier analysis.

9. The method of claim 8, further comprising the step of analyzing the amplitudes of the first through fifth orders.

10. A method for analyzing a tire noise pitch sequence based on tire tread lug stiffness variations; the method comprising the steps of:
    (a) defining the tire noise pitch sequence and the pitch ratios;
    (b) identifying the pitch lengths for the tire noise pitch sequence; and
    (c) performing a spectral analysis of the accumulation of the deviation of an arc length from an arc length of the mean pitch size.

11. The method of claim 10, wherein step (c) includes the step of performing a Fourier analysis.

12. The method of claim 10, wherein step (c) includes the steps of:
    (d) calculating the arc length from an arbitrary fixed reference point to the end of each pitch length of the pitch sequence;
    (e) calculating the mean pitch arc length for each pitch length of the pitch sequence; and
    (f) analyzing the difference between the arc lengths of the pitch sequence and the arc lengths of the mean pitch lengths.

13. The method of claim 12, wherein step (f) includes the step of performing a Fourier analysis on the difference.

14. The method of claim 13, further including the step of calculating the difference with the formula $D=X_i-\text{mean } X_i$, where $X_i=\text{sum } L_j$ (j=1 to i) and mean $X_i=(i)(C/N)$; wherein N is the total number of tread pitches placed about the circumference of the tire; C is the circumference of the tire; $X_i$ is the arc length from the fixed reference point to the end of the $i^{th}$ tread pitch; L is the length of the pitch; and mean $X_i$ is the arc length of i pitches times the mean pitch size.

15. The method of claim 13, further comprising the step of analyzing the variance in the first through fifth orders identified by the Fourier analysis.

16. The method of claim 15, further comprising the step of analyzing the amplitudes of the first through fifth orders.

17. A tire having a tire noise pitch sequence selected by the method of claim 10.

18. A method for analyzing a tire noise pitch sequence based on tire tread lug stiffness variations; the method comprising the steps of:
   (a) defining the tire noise pitch sequence and the pitch ratios;
   (b) identifying the pitch lengths for the tire noise pitch sequence;
   (c) calculating the arc length from an arbitrary fixed reference point to the end of each pitch length of the pitch sequence;
   (d) calculating the mean pitch arc length for each pitch length of the pitch sequence;
   (e) using a Fourier analysis to analyze the difference between the arc lengths of the pitch sequence and the arc lengths of the mean pitch lengths, wherein the difference is calculated with the formula $D=X_i-\text{mean } X_i$, where $X_i=\text{sum } L_j$ (j=1 to i) and mean $X_i=(i)(C/N)$; wherein N is the total number of tread pitches placed about the circumference of the tire; C is the circumference of the tire; $X_i$ is the arc length from the fixed reference point to the end of the $i^{th}$ tread pitch; L is the length of the pitch; and mean $X_i$ is the arc length of i pitches times the mean pitch size; and
   (f) analyzing the variance in the first through fifth orders identified by the Fourier analysis.

19. The method of claim 18, further comprising the step of analyzing the amplitudes of the first through fifth orders.

* * * * *